(12) United States Patent  
Chu

(10) Patent No.: US 6,967,689 B1  
(45) Date of Patent: Nov. 22, 2005

(54) SYSTEM AND METHOD FOR PROVIDING A VARIABLE CHARACTER SIZE IN AN ON-SCREEN DISPLAY APPLICATION

(75) Inventor: Cyrus Chu, Fremont, CA (US)

(73) Assignee: Pixelworks, Inc., Tualatin, OR (US)

( * ) Notice: Subject to any disclaimer, the term of this patent is extended or adjusted under 35 U.S.C. 154(b) by 530 days.

(21) Appl. No.: 10/142,547

(22) Filed: May 8, 2002

Related U.S. Application Data

(60) Provisional application No. 60/289,690, filed on May 8, 2001.

(51) Int. Cl.[7] .......................... H04N 5/50; G06T 11/00
(52) U.S. Cl. ...................... 348/569; 345/471; 345/467
(58) Field of Search ............................ 348/569, 581, 348/589, 714; 345/467, 469, 471, 472, 470, 345/468

(56) References Cited

U.S. PATENT DOCUMENTS

| | | | |
|---|---|---|---|
| 4,953,102 A | * | 8/1990 | Kimura et al. .............. 345/467 |
| 5,221,921 A | * | 6/1993 | Statt .......................... 345/471 |
| 5,519,412 A | * | 5/1996 | Watanabe ................. 345/472.2 |
| 5,590,247 A | * | 12/1996 | Mikuni ...................... 358/1.11 |
| 5,790,093 A | * | 8/1998 | Takahashi ................... 345/472 |

* cited by examiner

Primary Examiner—Michael H. Lee  
(74) Attorney, Agent, or Firm—Marger Johnson & McCollom

(57) ABSTRACT

The invention provides a system and method for providing a variable character size in an on-screen display application. The system includes logic means and a font memory means adapted to store a plurality of bitmaps corresponding to a plurality of characters. A mapping memory means is adapted to map the plurality of characters into the plurality of bitmaps. And a display means is adapted to display the plurality of bitmaps responsive to the logic means. The mapping memory comprises a width and a height associated with each of the plurality of characters. The mapping memory comprises a pointing means adapted to store an address associated with each of the plurality of bitmaps.

24 Claims, 8 Drawing Sheets

SYSTEM AND METHOD FOR PROVIDING A VARIABLE CHARACTER SIZE IN AN ON-SCREEN DISPLAY APPLICATION

This application claims priority from U.S. provisional patent application Ser. No. 60/289,690, filed May 8, 2001, incorporated herein by reference.

BACKGROUND OF THE INVENTION

1. Field of the Invention

The invention provides for a system and method for manipulating digital image data capable of being displayed on a variety of digital display devices including flat panel displays. More particularly, the invention is a system and method for providing a variable character size in an on-screen display application.

2. Description of the Related Art

Current display systems include on-screen display (OSD) circuitry capable of displaying, on a predetermined portion of the display device, textual and/or graphic information overlaid on signals typically provided to the display device. Television sets, for example, often display channel numbers and/or closed captioning text over video signals associated with the displayed show. Computer monitors, for another example, often display brightness, contrast, or other display control information over running software applications, e.g., word processing, spreadsheet, drawing, and other applications.

OSD circuitry operates in either graphic or text mode. High-end display systems often implement OSD circuitry using the graphic mode. In the graphic mode, the OSD circuitry stores bitmaps in typically large memories. Bitmaps represent a graphic image using rows and columns of picture elements (pixels) stored in memory. The OSD circuitry provides the bitmap to the display.

The OSD circuitry stores the value of each pixel in one or more bits of data, e.g., 2 to 24 bits per pixel. The value of each pixel might represent luminance of the corresponding pixel. The more colors and shades of gray, the more bits the OSD circuitry uses to represent the value of the pixel. The OSD circuitry requires a larger bitmap memory the more bits it uses to represent the pixel. Consequently, the cost of the OSD circuitry increases proportionately to the number of bits used to represent the value of each bitmapped image pixel.

For example, assume the OSD circuitry wants to display a 512×200 bitmapped image in at least 16 colors (4 bits for each pixel) to an XGA (1024×768) resolution display device. In this example, the bitmap memory must be at least 50 Kbytes.

(512×200 pixels)×(4 bits/pixel)×(1 byte/8 bits)= 50 Kbytes

The bitmap memory increases to over 200 Kbytes if the OSD circuitry displays the same 512×200 bitmapped image in 256 colors (8 bits for each pixel).

(512×200 pixels)×(16 bits/pixel)×(1 byte/8 bits)= 200 Kbytes

Because of memory cost, low-end display systems implement OSD circuitry using the text mode. In the text mode, the OSD circuitry stores individual character codes in smaller character memory, e.g., random access memory, instead of storing graphic image bitmaps in large memories. The OSD circuitry uses the character codes to look up simple bitmaps of the individual characters in smaller font memory, typically implemented as either random access or read-only memories. These simple bitmaps include a single bit value for each pixel, the bit value indicating a foreground and a background color.

Many implementations of the text mode fix a height and width of the characters to be displayed. Even when the height and width is user programmable, it is identical for all characters within a displayed message or menu. An advantage to fixing the height and width is simplified controller design because a starting address of each character bitmap stored in a font memory is easily calculable.

A disadvantage is poor memory management since character bitmaps are often stored with unnecessary blank spaces. Referring to FIG. 1, the bitmap for some characters, e.g., the bitmap 102 for the letter "w," requires maximization of width resulting in blank spaces 104 being added to the top and/or bottom of the bit map. The bitmap for other characters, e.g., the bitmap 108 for the letter "i" and/or the bitmap 110 for the letter "t" requires maximization of height resulting in black spaces 114 being added to the left and/or right of the bitmap. That is, the amount of memory space is independent of the footprint of the particular character. And the most complex character to be displayed typically defines the amount of memory space allotted per character.

Another disadvantage is that characters with widely varying footprints must be fit to particular height and width restrictions. Referring to FIGS. 1 and 2, the bitmaps 202, 204, and 206 for uppercase characters, e.g., the letters "P," "O," or "S", might touch the sky line (upper height limitation) 208 while the bitmap 112 for lowercase characters, e.g., the letter "y", might touch the ground line (lower height limitation) 116. This results in poor character quality since different characters might require different height and width restrictions to improve their display.

Accordingly, a need remains for a system and method for providing a variable character size an OSD application.

BRIEF DESCRIPTION OF THE DRAWINGS

The foregoing and other objects, features, and advantages of the invention will become more readily apparent from the following detailed description of a preferred embodiment that proceeds with reference to the following drawings.

DETAILED DESCRIPTION OF THE PREFERRED EMBODIMENT

Figure 1:
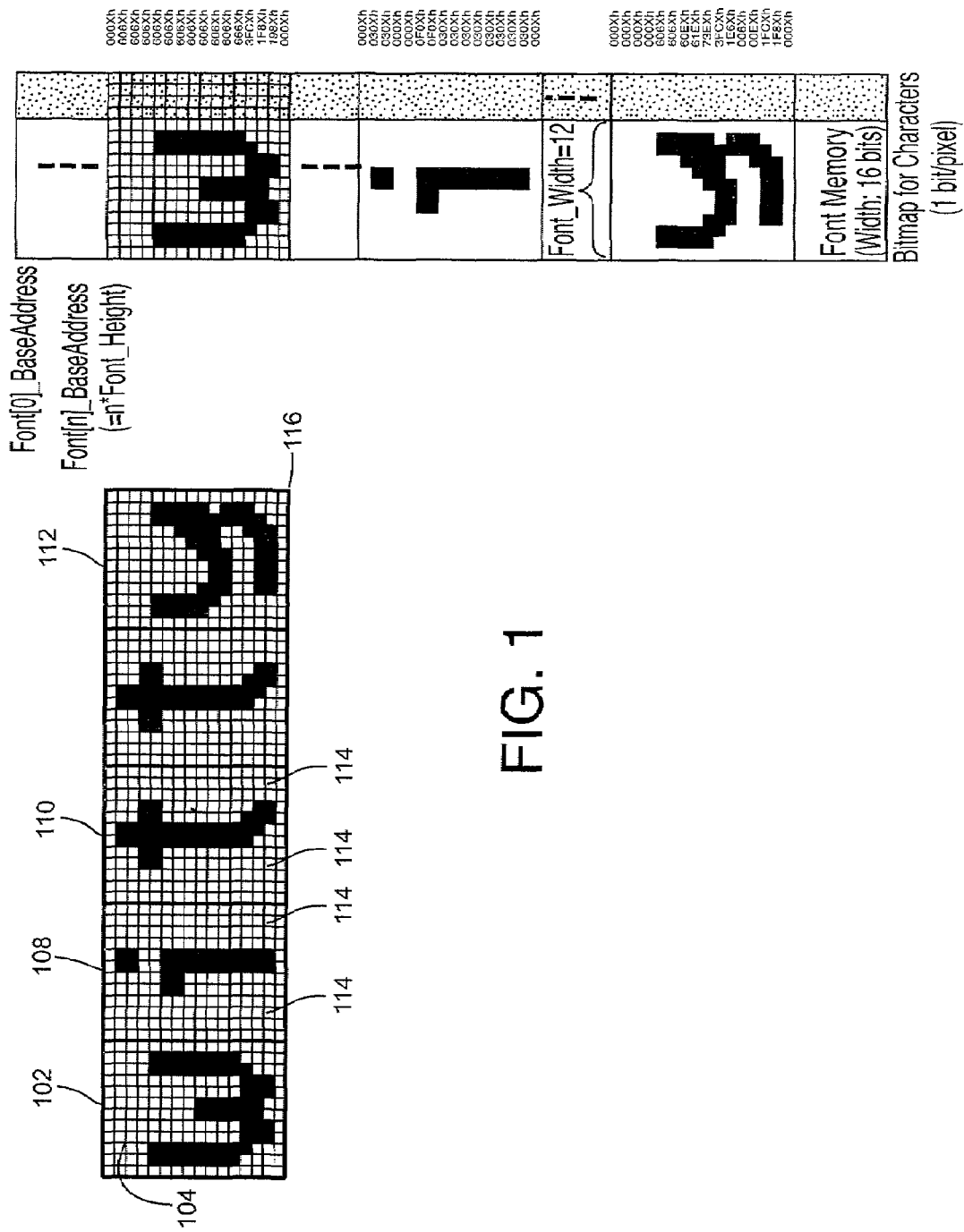
FIG. 1 is a diagram of fixed size character bitmaps stored in font memory.
Figure 2:
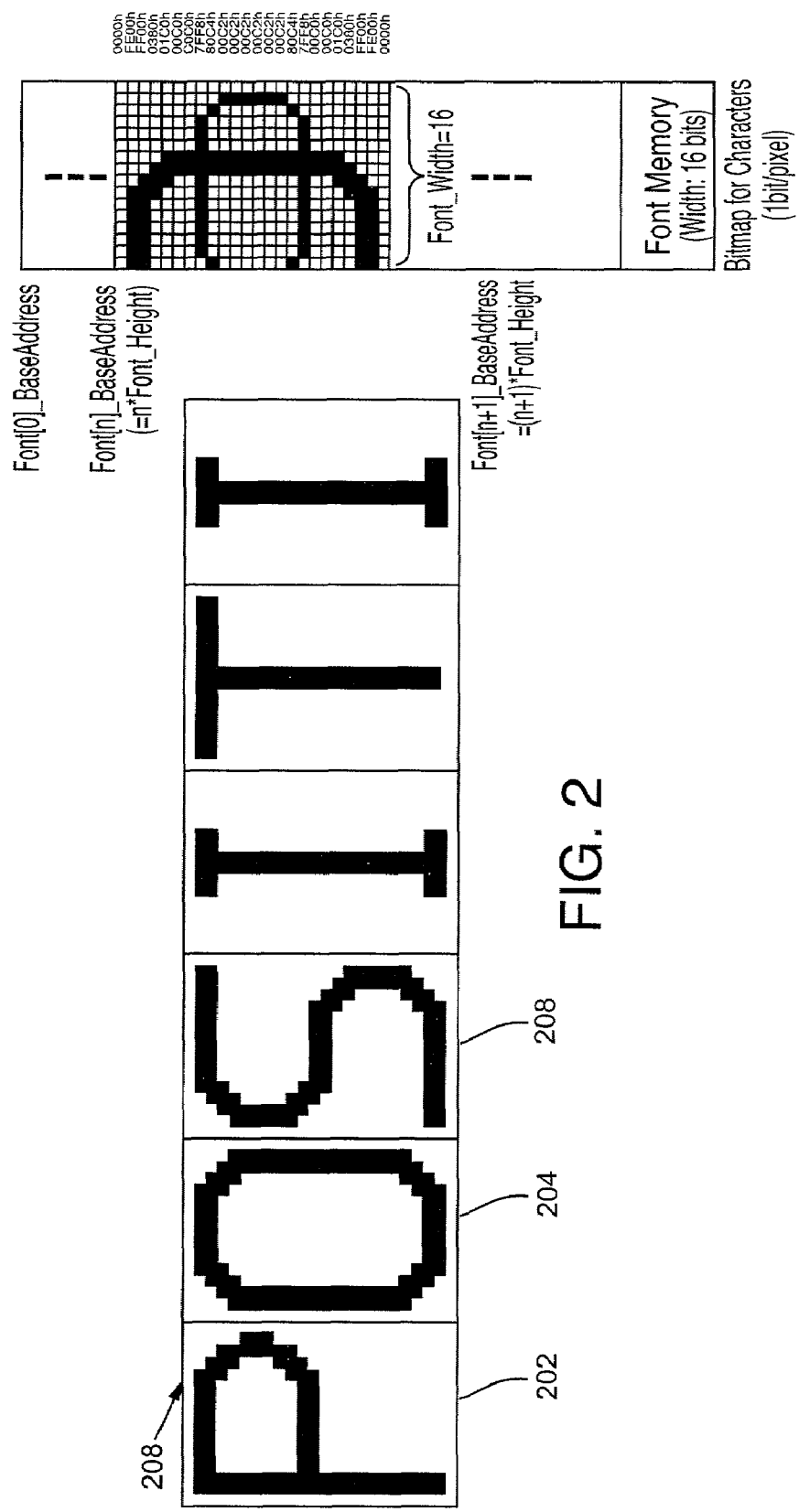
FIG. 2 is a diagram of fixed size character bitmaps stored in font memory.
Figure 3:
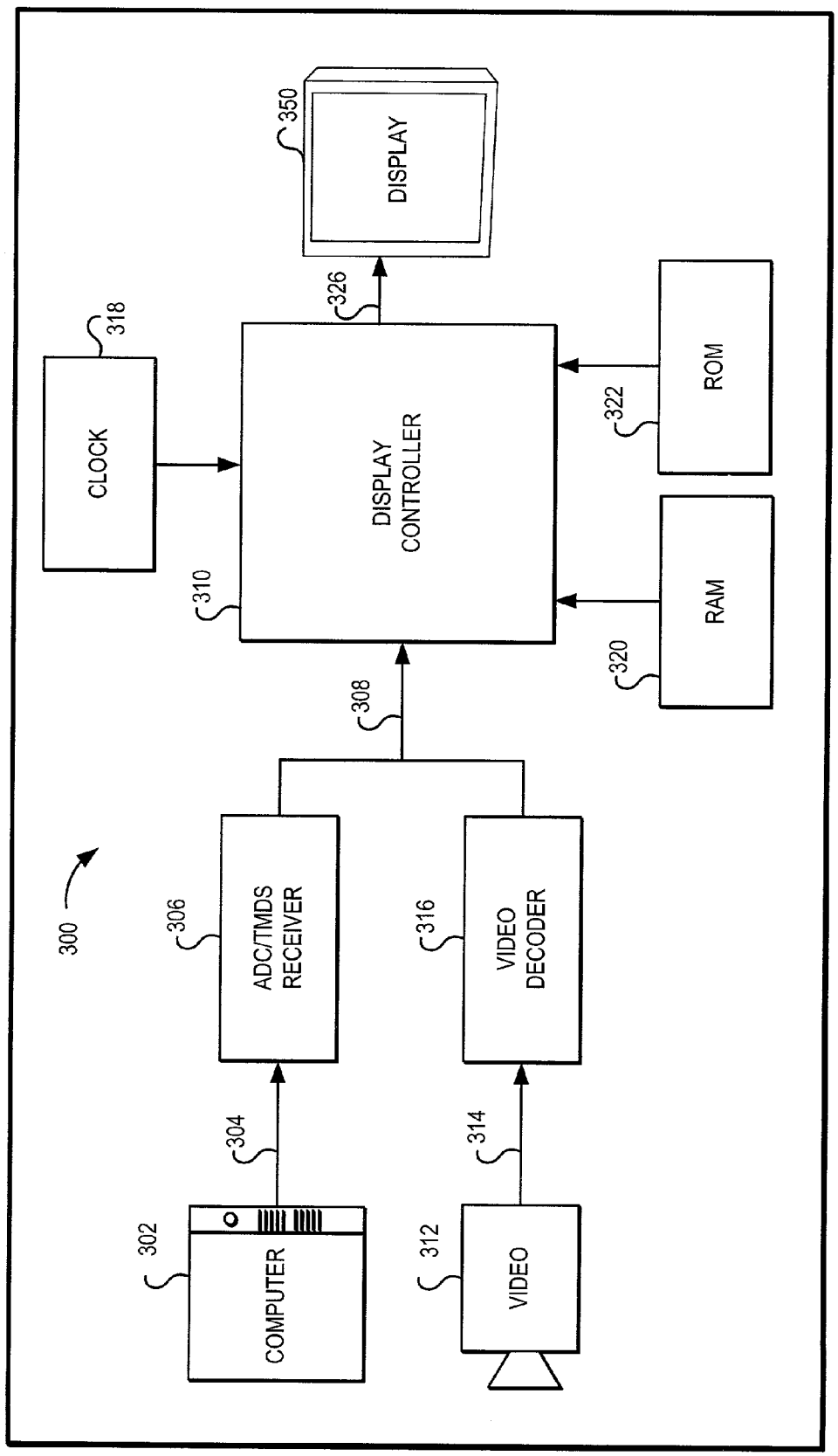
FIG. 3 is a block diagram of an embodiment of the display system of the present invention.

FIG. 3 is a block diagram of a system 300 adapted to display an image. The system includes a receiver 306 for receiving an analog image data signal 304, e.g., an RGB signal, from a source 302. The receiver 306 might be an analog-to-digital converter (ADC), transition minimized differential signal (TMDS) receiver, or other device adapted to convert the analog image data signal 304. The source 302 might be a personal computer and the like. Likewise, a video receiver or decoder 316 decodes an analog video signal 314 from a video source 312. The video source 312 might be a video camcorder and the like. The receiver 306 converts the analog image data signal 304 into digital image data 308. Likewise, the decoder 316 converts the analog video signal 314 into digital image data 308. The receiver 306 provides the digital image data 308 to the display controller 310.

The display controller 310 generates display data 326 by manipulating the digital image data 308. The display controller 310 provides the display data 326 to a display device 350. The display device 350 is any device capable of displaying digital image data 308. In one embodiment, the display 350 is a pixelated digital display that has a fixed pixel structure. Examples of pixelated displays are a liquid crystal display (LCD) projector, flat panel monitor, plasma display (PDP), field emissive display (FED), electro-luminescent (EL) display, micro-mirror technology display, and the like.

In one embodiment, the display controller 310 might scale the digital image data 308 for proper display on the display device 350 using a variety of techniques including pixel replication, spatial and temporal interpolation, digital signal filtering and processing, and the like. In another embodiment, the controller 310 might additionally change the resolution of the digital image data 308, the frame rate, and/or convert the pixel rate encoded in the digital image data 308. Resolution conversion and/or frame rate conversion are not central to the invention and are not discussed in further detail. A person of reasonable skill in the art should recognize that the controller 310 manipulates the digital image data 308 in a variety of manners to generate display data 326 that it provides to a display device 350. The display device 350 is capable of properly displaying a high quality image using the digital image data 326 regardless of display type.

The display controller 310 is coupled to read-only (ROM) and random access (RAM) memories 322 and 320, respectively. The ROM and RAM 322 and 320, respectively, store bitmaps, FIR filter coefficients, and the like. Clock 318 controls timing associated with various operations of the controller 310.

Figure 4:
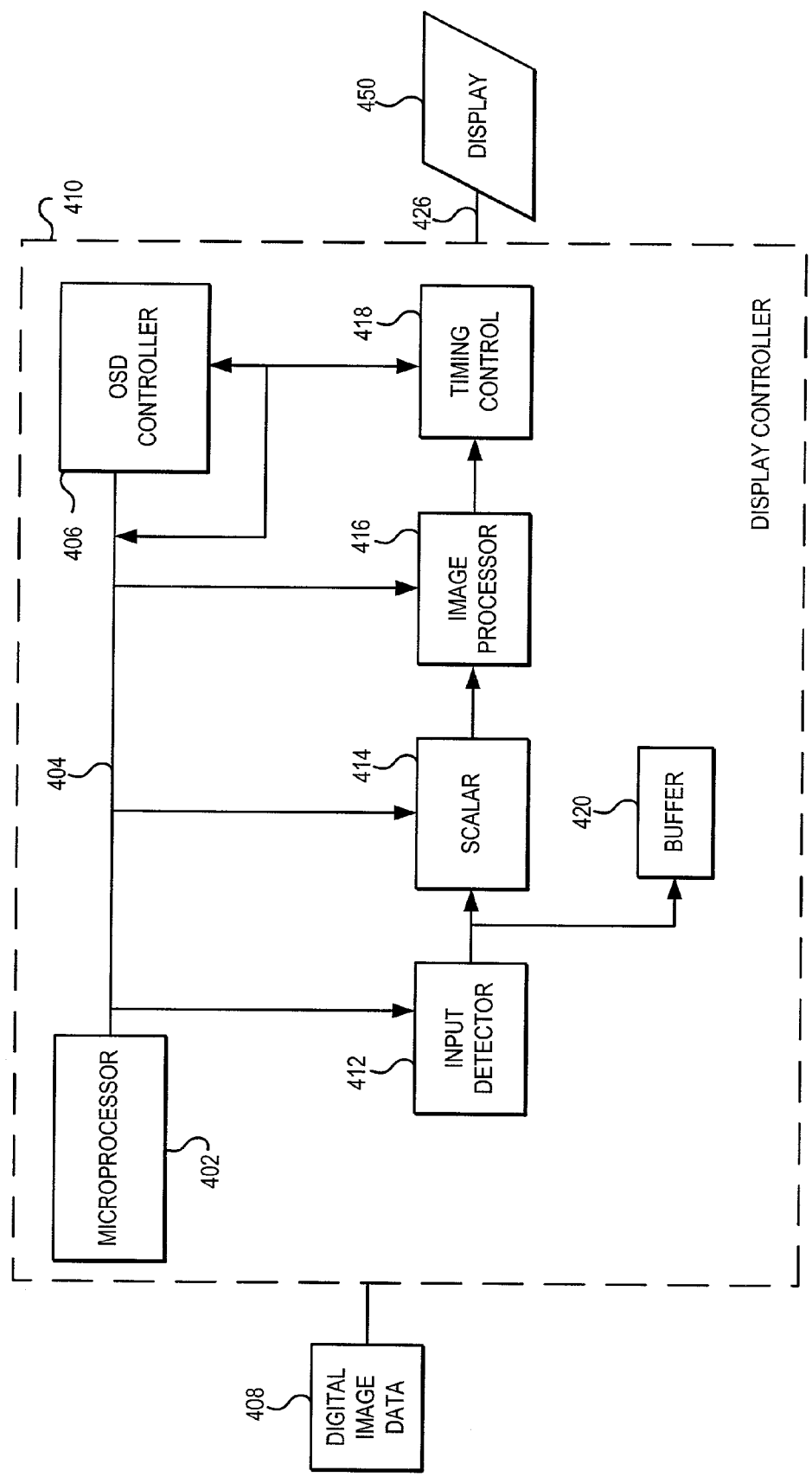
FIG. 4 is a block diagram of an embodiment of the display controller shown in FIG. 3.

FIG. 4 is a block diagram of an embodiment of the controller 310 shown in FIG. 3. Referring to FIG. 4, the controller 410 processes digital image data 408 and provides display data 426 to a display device 450. The controller 410 includes a microprocessor 402 adapted to perform all of the control functions necessary for the display controller 410. For example, the microprocessor 402 might control the OSD controller 406, the input detector 412, the scalar 414, and the like. In one embodiment, the microprocessor 402 is an integrated (on-chip) general purpose, microprocessor, e.g., a 16-bit, x86-compatible processor with up to 32 Kbytes of RAM. In another embodiment, the microprocessor 402 is coupled externally to (off chip), not integrated with, the display controller 410. The microprocessor 402 might run at high clock rates, e.g., 50 MHz. The microprocessor 402 might include a large address space, e.g., of up to a one-megabyte. A person of reasonable skill in the art should recognize that the configuration of the microprocessor 402 varies with the specific application, cost, size, and speed, as well as other constraints.

The display controller 410 receives digital image data 408 at an input detector 412 coupled to the microprocessor 402 through bus 404. The input detector 412 is adapted to detect and/or identify the digital image data 408 and might include a red-green-blue (RGB) port (not shown) for processing digital graphic images and a video port (not shown) for processing video image signals.

The input detector 412 receives digital image data 408 for a digital pixelated image that is, where the image is represented by an array of individually activated pixels previously converted from an analog image source such as sources 306 and 316 (FIG. 3). The input detector 412 might receive data at high speeds, e.g., up to 230 Mpixels/second, to thereby support a variety of display modes up to UXGA. Alternatively, the input detector 412 might receive RGB data having 1 or 2, 24-bit pixels per clock. The input detector 412 includes a sync processing circuit (not shown) that can operate from separate, composite, or sync-on-green sync signals. The input detector 412 supports both interlaced and progressive scanned RGB inputs as well as on-chip YUV to RGB conversion. The input detector might support half-frequency sampling for lower cost display system implementations. Half-frequency sampling reduces system cost by allowing the use of 100 MHz ADCs—FIG. 3 shows a system 300 including an ADC/TMDS receiver 306—while maintaining UXGA image capturing capabilities. Half-frequency sampling involves capturing even pixels on one frame and odd pixels on the following frame.

The input detector 412 includes a variety of image processing features including automatic image optimization (not shown) for sample clock frequency, phase, black and white levels, image position, and color balance adjustments that do not require user intervention. Advanced synchronization decoding (not shown) allows for a wide variety of synchronization types.

The display controller 410 might include a scalar 414 and a buffer 420 controlled by an image processor 416 and a timing controller 418. The scalar 414 scales the digital image data 408 in a vertical and/or horizontal direction using a variety of scaling techniques as explained above. In one embodiment, the buffer 420 is RAM adapted to buffer scan lines of the digital image data 408. In another embodiment, the buffer 420 is RAM adapted to buffer frames of the digital image data 408. The timing controller 418 is adapted to control timing associated with the image processor 416. The image processor 416, in turn, is adapted to control functional blocks within the controller 410 associated with manipulating the digital image data 408, for example, the scalar 414 and the like. The image processor 416 might include a rotational feature (not shown) that allows rotating a received image by a predetermined number of degrees.

The display controller 410 might further include a full complement of microprocessor peripherals (not shown). In one embodiment, the controller includes I/O ports (e.g., 8-bit I/O ports), an infrared decoder, timers (e.g., 16-bit timers), a watchdog timer, a programmable interrupt controller, an RS-232 serial port, ROM and RAM interface, and decode logic for external peripherals. In another embodiment, the controller 410 might include the above mentioned microprocessor peripherals on-chip, allowing a complete microprocessor system to be implemented by merely adding external memory such as RAM 320 and ROM 322 shown in FIG. 3.

The display controller 410 might further include an OSD controller 406 adapted to control on-screen display processes. The OSD controller 406 is coupled to the microprocessor 402 and other functional blocks (e.g., the input detector 412, the scalar 414, the image processor 416, and timing controller 418) through the bus 404. An embodiment of the OSD controller 406 is shown in FIG. 5.

Figure 5:
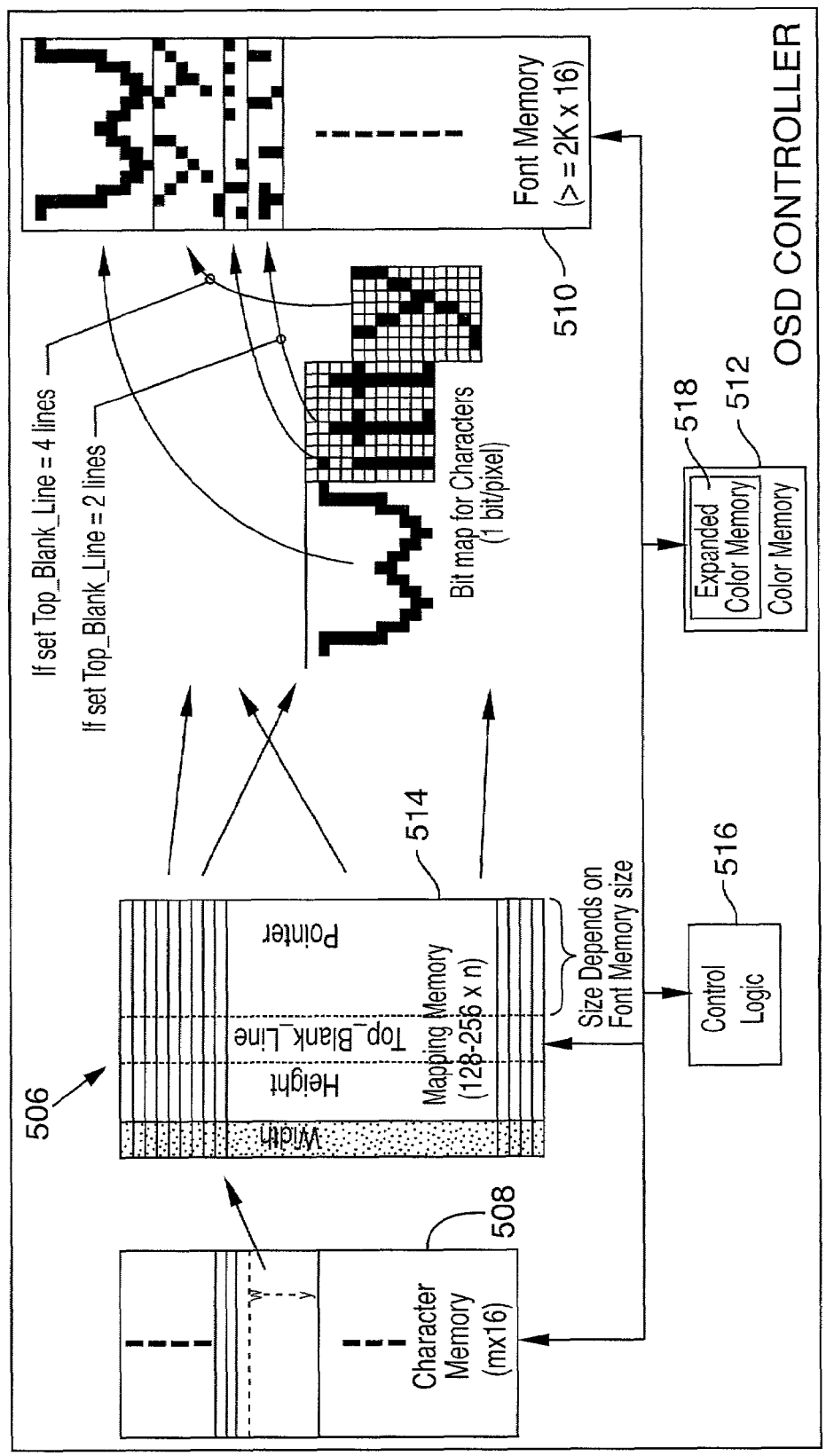
FIG. 5 is a block diagram of an embodiment of the OSD controller shown in FIG. 3.

Referring to FIG. 5, the OSD controller 506 includes a color memory 512 coupled to a character memory 508, a mapping memory 514, font memory 510, and control logic 516. The color memory 512 might, in turn, include an expanded color memory 518. The color memory 512 stores color codes used to display the characters on the display 450 (FIG. 4). The expanded color memory 518 maps or addresses color attributes stored in the character memory 508 to the main color memory 512. The main color memory 512 and the expanded color memory 518 are explained in further detail in co-pending related patent application titled System And Method For Mixing Graphics And Text In An On-Screen Display Application, filed herewith.

The character memory 508 includes a plurality of character definitions associated with a plurality of characters to be displayed e.g., on the display 450 (FIG. 4). A character definition defines attributes of a particular character, e.g., foreground or background colors of the character. A person of reasonable skill in the art should recognize other possible attributes capable of definition by the character definition.

Figure 7:
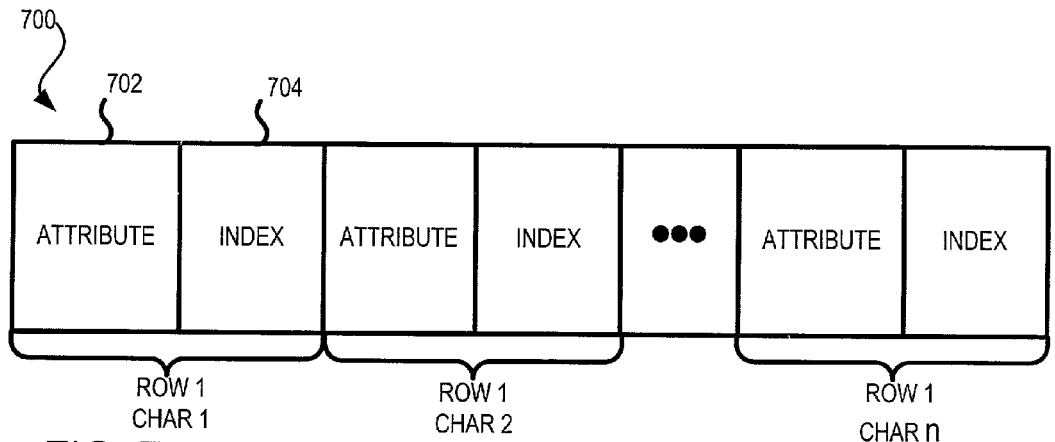
FIG. 7 is a diagram of an embodiment of a character definition of the present invention.

Referring to FIGS. 5 and 7, each character definition stored in the character memory 508 defines a character with an index portion, e.g., index portion 704, and an attribute portion, e.g., attribute portion 702. The index portion 704 is adapted to store a font index associating the defined character with its corresponding bitmap stored in font memory 510. Thus, each index portion, e.g., index portion 704, addresses a bitmap stored in font memory 510 that represents the character to be displayed as stored in the character memory 508.

The font memory 510 stores bitmaps of individual characters to be displayed on the display 450 (FIG. 4) rather than storing large bitmaps of complete display screens. The character memory 508 is adapted to address or index the font memory 510. The mapping memory 514 is interposed between the character memory 508 and the font memory 510. The mapping memory 514 is adapted to map a bitmap of the individual character responsive to the character memory 508. The mapping memory 514 provides for effective storage of the bitmaps in the font memory 510 as explained in further detail below. The mapping memory 514 additionally provides character information to the control logic 516 to enable display of the characters on the display 450 (FIG. 4). In one embodiment, the character memory 508, mapping memory 514, and font memory 510 are RAM.

Figure 8:
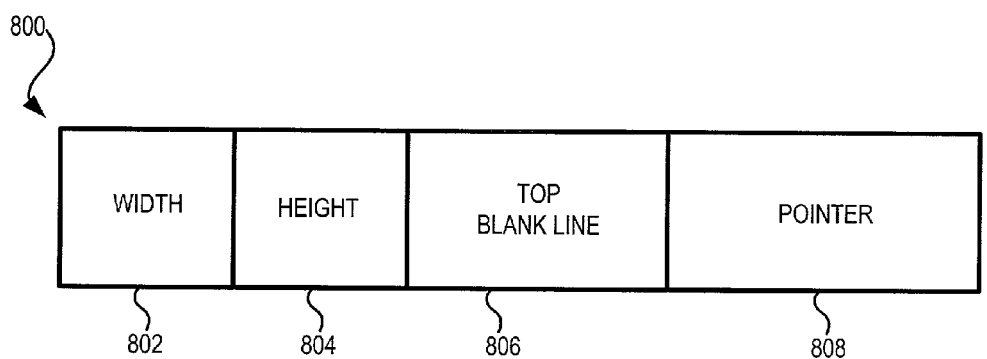
FIG. 8 is a diagram of an embodiment of a memory mapping unit of the present invention.

Referring to FIGS. 5, 7, and 8, for each character bitmap stored in the font memory 510, a relative mapping unit 800 is stored in the mapping memory 514. FIG. 8 is an embodiment of a mapping unit 800 in the mapping memory 514. Each mapping unit 800 includes character size information such as character width 802 or height 804 or both, and/or a pointer 808 to a starting address of where the character bitmap is to be stored in the font memory 510. The mapping unit 800 might additionally include a top blank line portion 806 indicating a number of top blank lines to use when displaying the associated character, as explained in further detail below.

For each character bitmap to be stored in the font memory 510, a user programs the pointer 808. Alternatively, the control logic 516 automatically calculates the pointer 808 responsive to the index portion 704 stored in the character memory 508. The control logic 516 reads the font memory 510 with the address pointed to by the pointer 808. The font memory 510 then shifts out or multiplexes the bitmap data every bit (for a single channel) or every two bits (for a dual channel; odd/even pixels) to pipeline it.

Display signals are synchronized to a horizontal synchronization (HSYNC) signal (not shown). Thus, the OSD controller 506 is capable of displaying and/or processing one row at a time of the character bitmap stored in the font memory 510 with each instance of the HSYNC signal. For example, let Font[n]_Pointer indicate a pointer 808 to a character bitmap with index portion 704 equal to n and let the bitmap stored in font memory 510 be Font[n]_StoreWidth using a same number of bits for its width as Font[n]_Width (Font[n]_Width might be less than or equal to Font[n]_StoreWidth; Font[n]_Width relates to the pipeline depth). Let the width of the bitmap stored in the font memory 510 be FRAM_Width. The pointer 808 points to the address of the current row (Row_No) in the font memory 510 as follows.

Pointer (Row_No of character n)=Font[n]_Pointer+ ((Row_No*Font[n]_Width)/FRAM_Width)

When Font[n]_Width Font[n]_StoreWidth, the logic control 516 could further compact the character bitmap stored in the font memory 510 but the division required by the formula given above is cumbersome to implement. This is simplified by allowing dummy bits as follows.

If Font[n]_Width=$2^k$ where k=0, 1, 2, 3, . . . ; then
Font[n]_StoreWidth=Font[n]_Width; else
Font[n] StoreWidth=$2^{INTEGER(k+1)}$.

Let FRAM_Width=Font[n]_StoreWidth*($2^m$) where m=0, 1, 2, 3, 4, . . .

Where the Font[n]_Width indicates a total number of horizontal displaying dots and the Font[n]_StoreWidth indicates actual bitmap width in the font memory 510.

By allowing dummy bits, the logic control 516 need not undertake a division as contemplated above but rather reach a similar result with a simple shift right by m bits. The logic control 516 then calculates the current row address as follows.

Pointer (Row_No of character n)=Font[n]_Pointer+ (Row_No >>m).

The control logic 516 fetches the character bitmap stored in the font memory 510 for eventual display on the display 450 (FIG. 4). Let the current row of the character bitmap be located at an address given by the following.

If m=0, the row is at FRAM(Pointer (Row_No of character n)) [0: Font[n]_Width−1].
If m=1, the row is selected from:
a) FRAM(Pointer (Row_No of character n)) [0: Font[n]_Width—1] if Row_No <0>==0.
b) FRAM(Pointer (Row_No of character n)) [Font[n]_StoreWidth: Font[n]_StoreWidth+Font[n]Width−1] if Row_No <0>==1.
If m=2, the row is selected from:
a) FRAM(Pointer (Row_No of character n)) [0: Font[n]_Width−1] if Row_No <1:0>==00b.
b) FRAM(Pointer (Row_No of character n)) [Font[n]_StoreWidth: Font[n]_StoreWidth+Font[n]_Width−1] if Row_No <1:0>==01b.

c) FRAM(Pointer (Row_No of character n)) [Font[n]_StoreWidth*2: Font[n]_StoreWidth*2+Font[n]_Width−1] if Row_No <1:0>==10b.

d) FRAM(Pointer (Row_No of character n)) [Font[n]_StoreWidth*3: Font[n]_StoreWidth*3+Font[n]Width−1] if Row_No <1:0>==11b.

For example, assume a 1 bit/pixel character bitmap. A set of characters may have different character widths like 1, 2, 3, 4, . . . , 16, 17, . . . . A bitmap of a lower case "i," for example, could have a width 1 or 2 or 4 (if bolded out). A bitmap of an upper case "W," for another example, could have a width 16. To easily address the font memory 510, we might conclude:

Font[n] Store_Width=1 for Font[n]Width=1
Font[n]_Store_Width=2 for Font[n]_Width=2
Font[n]_Store_Width=4 for Font[n]_Width=3 or 4
Font[n]_Store_Width=8 for Font[n]_Width=5 or 6 or 7 or 8
Font[n]_Store_Width=16 for Font[n]_Width=9_16
Font[n]_Store_Width=32 for Font[n]_Width=17~32

This is because the font memory 510 has a predetermined width, e.g., 16 or 32 bits thus it is easier to calculate the bits relative to a row and column in the bitmap.

Figure 6:
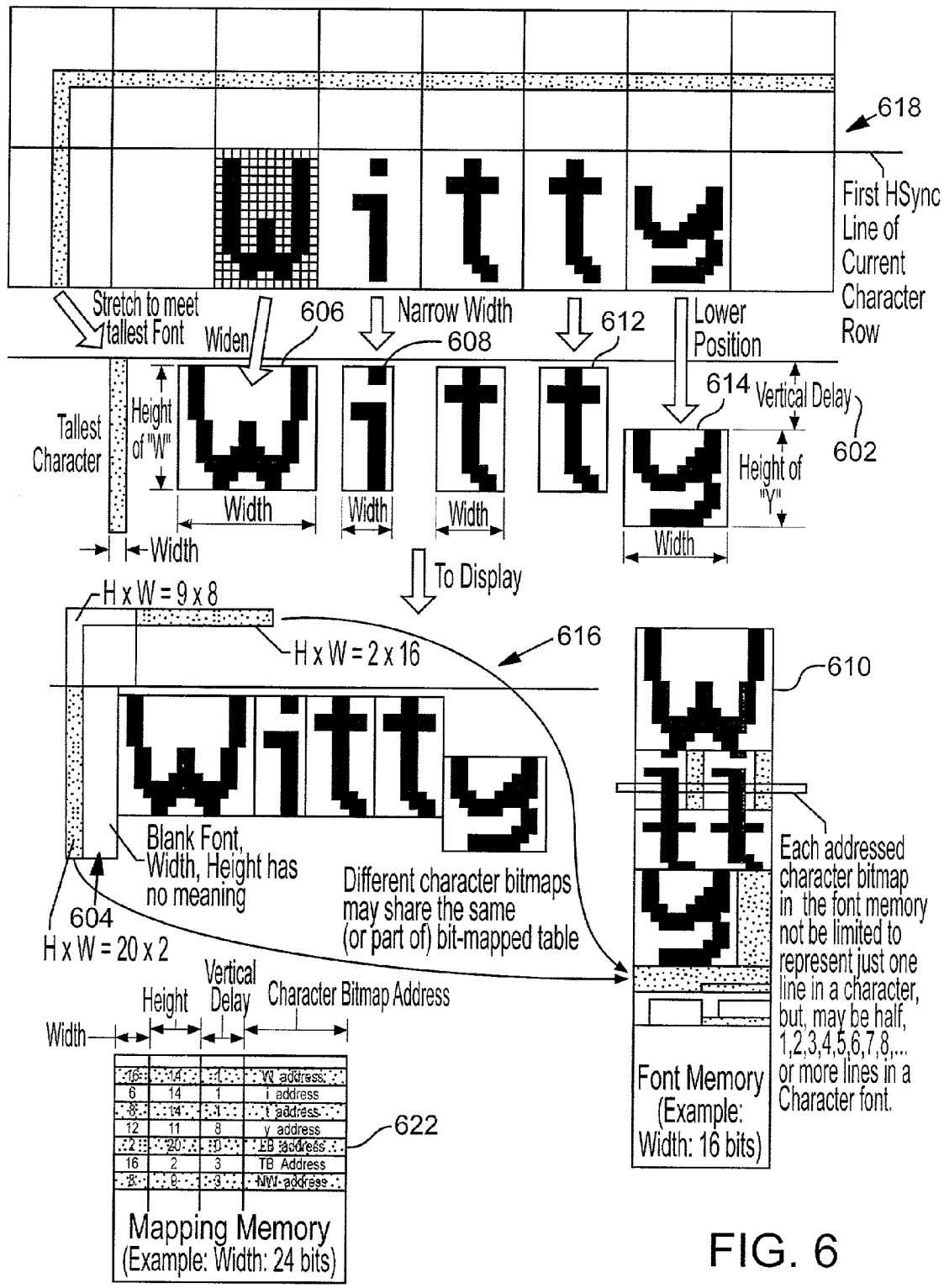
FIG. 6 is a block diagram of an embodiment of the method of the present invention.

Referring to FIGS. 5, 6, and 8, an embodiment of the OSD controller 506 implements a top blank line or vertical delay 602 using a top blank line portion 806 included in the mapping unit 800 of the mapping memory 514. The top blank line portion 806 indicates to the control logic 516 a number of blank lines to include before displaying a particular character bitmap. The result is a higher quality OSD display because certain letters do not appear to touch the ground line as they would if the size of the characters were fixed.

Let Top_Blank_Line indicate a number of top blank lines in the top blank line portion 806.

If Display_Row_No of character n<Top_Blank_Line [n], control logic 516 shows background.

If Display_Row_No of character n≧Top_Blank_Line [n], control logic 516 fetches a character bitmap from the font memory 510 where Row_No of character n=(Display_Row_No-Top_Blank_Line).

Figure 9:
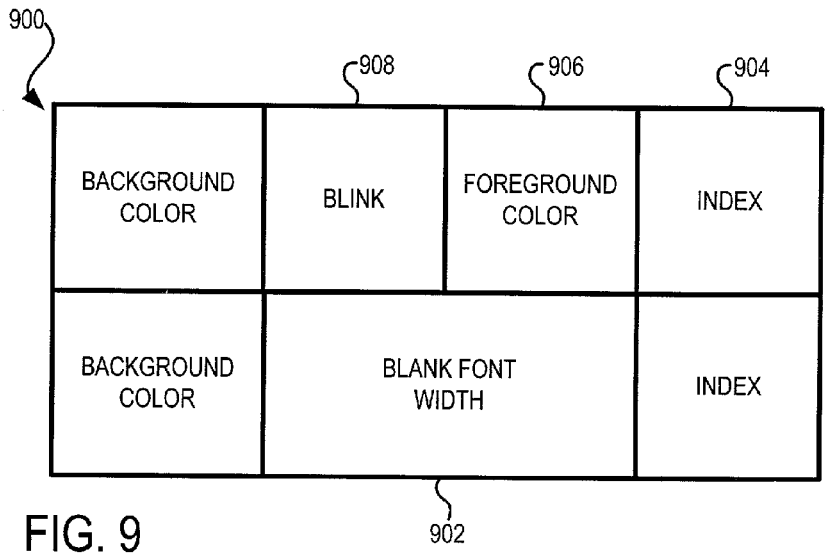
FIG. 9 is a diagram of an embodiment of a character definition of the present invention.

Referring to FIGS. 5, 6, and 9, an embodiment of the OSD controller 506 implements a flexible blank character 604 using a blank character portion 902 included in the character memory 508. The flexible blank character 904 allows characters with varying sizes to be properly aligned when displayed. In one embodiment, the flexible blank character 604 is implemented by setting the index portion 904 associated with the particular character to zero and using unused character attribute portions, e.g., a blink and a foreground color attribute portions 908 and 906, respectively, to indicate a particular width to the blank character. By doing so, the OSD controller 506 is capable of properly aligning characters with varying widths, for example, on a display.

Referring to FIGS. 5 and 6, the mapping memory 514 maps character bitmaps into the font memory 610 such that the bitmaps more precisely represent the footprint of the corresponding character. In this manner, the bitmap 606 for the letter "W" is stored wider in the font memory 610 than perhaps it would if it were forced into a fixed height and width, e.g., a 12×16 map as shown in block 618. Similarly, the bitmaps 608 and 612 for the letters "i" and "t," respectively, are stored narrower in the font memory 610 than perhaps they would have been were they forced into a fixed height and width as shown in block 618. The bitmap 614 for the letter "y" is displayed lower than it would have been under conventional OSD applications. The result, as shown in block 616, is a higher quality of OSD text display and better font memory 610 utilization and management. An embodiment of mapping units for block 620 is shown in the table 622.

Referring to FIG. 4, an embodiment of the display controller 410 is integrated into a monolithic integrated circuit. Alternatively, any number of discrete logic and other components might implement the invention. A dedicated processor system that includes a microcontroller or a microprocessor might alternatively implement the present invention. A person of reasonable skill in the art should recognize that different functional blocks such as those depicted in FIG. 4 might be integrated with or externally coupled to the display controller 410.

The invention additionally provides methods described below. The invention provides apparatus that performs or assists in performing the methods of the invention. This apparatus might be specially constructed for the required purposes or it might comprise a general-purpose computer selectively activated or reconfigured by a computer program stored in the computer. The methods and algorithms presented herein are not necessarily inherently related to any particular computer or other apparatus. In particular, various general-purpose machines might be used with programs in accordance with the teachings herein or it might prove more convenient to construct more specialized apparatus to perform the required method steps. The required structure for a variety of these machines will appear from this description.

Useful machines or articles for performing the operations of the present invention include general-purpose digital computers or other similar devices. In all cases, there should be borne in mind the distinction between the method of operating a computer and the method of computation itself. The present invention relates also to method steps for operating a computer and for processing electrical or other physical signals to generate other desired physical signals.

The invention additionally provides a program and a method of operation of the program. The program is most advantageously implemented as a program for a computing machine, such as a general-purpose computer, a special purpose computer, a microprocessor, and the like.

The invention also provides a storage medium that has the program of the invention stored thereon. The storage medium is a computer-readable medium, such as a memory, and is read by the computing machine mentioned above.

This detailed description is presented largely in terms of block diagrams, timing diagrams, flowcharts, display images, algorithms, and symbolic representations of operations of data bits within a computer readable medium, such as a memory. Such descriptions and representations are the type of convenient labels used by those skilled in programming and/or the data processing arts to effectively convey the substance of their work to others skilled in the art. A person skilled in the art of programming may use this description to readily generate specific instructions for implementing a program according to the present invention.

Often, for the sake of convenience only, it is preferred to implement and describe a program as various interconnected distinct software modules or features, collectively also known as software. This is not necessary, however, and there may be cases where modules are equivalently aggregated into a single program with unclear boundaries. In any event, the software modules or features of the present invention may be implemented by themselves, or in combination with others. Even though it is said that the program may be stored in a computer-readable medium, it should be clear to a person skilled in the art that it need not be a single memory, or even a single machine. Various portions, modules or features of it may reside in separate memories or separate machines where the memories or machines reside in the same or different geographic location. Where the memories or machines are in different geographic locations, they may be connected directly or through a network such as a local access network (LAN) or a global computer network like the Internet®.

In the present case, methods of the invention are implemented by machine operations. In other words, embodiments of the program of the invention are made such that they perform methods of the invention that are described in this document. These may be optionally performed in conjunction with one or more human operators performing some, but not all of them. As per the above, the users need not be collocated with each other, but each only with a machine that houses a portion of the program. Alternately, some of these machines may operate automatically, without users and/or independently from each other.

Methods of the invention are now described. A person having ordinary skill in the art should recognize that the boxes described below might be implemented in different combinations and in different order. Some methods may be used for determining a location of an object, some to determine an identity of an object, and some both.

Figure 10:
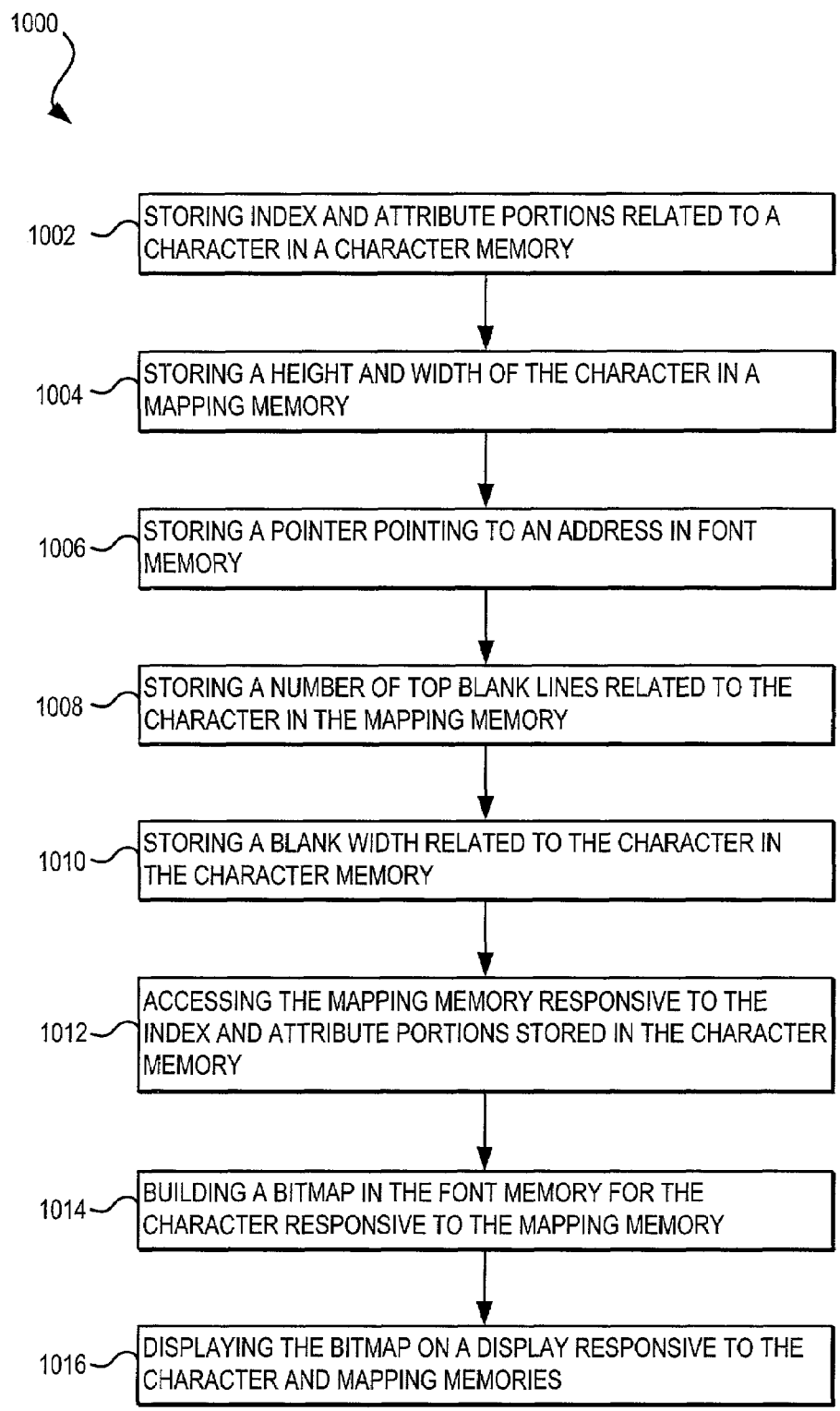
FIG. 10 is a flowchart of an embodiment of the method for providing a variable character size in an OSD application of the present invention.

FIG. 10 is a flowchart of an embodiment of the method 1000 according to the present invention. Referring to FIG. 10, at box 1002, the method stores an index and attribute portions related to a character in a character memory. The method stores height and width of the character in a mapping memory (box 1004). At box 1006, the method stores a pointer pointing to an address in the font memory. The method then stores a number of top blank lines (vertical delay) related to the character in the mapping memory (box 1008). At box 1010, the method stores a blank character width related to the character in the character memory. At box 1012, the character memory accesses the mapping memory responsive to the index and attribute portions. The mapping memory builds a bitmap of the character in the font memory responsive to the index and attribute portions in the character memory (box 1014). At box 1016, the method displays the bitmap of the character on a display device responsive to the character and mapping memories. In one embodiment, the bitmap display is synchronized with the HSYNC signal.

Having illustrated and described the principles of our invention, it should be readily apparent to those skilled in the art that the invention can be modified in arrangement and detail without departing from such principles. I claim all modifications coming within the spirit and scope of the accompanying claims.

I claim:

1. An on-screen display controller comprising:
a character memory including index and attribute portions corresponding to a character to be displayed;
a font memory adapted to store a bitmap associated with the character; and
a mapping memory adapted to map the bitmap into the font memory responsive to the index portion of the character memory;
wherein the character memory includes a blank width portion adapted to store a blank width associated with the character.

2. The on-screen display controller of claim 1 wherein the mapping memory comprises:
a width portion adapted to store a width associated with the bitmap; and
a height portion adapted to store a height associated with the bitmap.

3. The on-screen display controller of claim 1 wherein the mapping memory comprises a pointer adapted to store an address to the font memory.

4. The on-screen display controller of claim 3 wherein the pointer is adapted to be programmed.

5. The on-screen display controller of claim 1 wherein the mapping memory comprises a top blank line portion adapted to store a number of top blank lines associated with the character.

6. The on-screen display controller of claim 1 wherein the mapping memory comprises a static random access memory.

7. The on-screen display controller of claim 1 wherein the mapping memory comprises a plurality of flip flop registers.

8. A display system comprising:
logic means;
font memory means adapted to store a plurality of bitmaps corresponding to a plurality of characters;
mapping memory means adapted to map the plurality of characters into the plurality of bitmaps; and
display means adapted to display the plurality of bitmaps responsive to the logic means;
wherein the character memory means comprises a blank line width adapted to define a width of a blank line to include after each of the plurality of characters.

9. The display system of claim 8 comprising:
character memory means adapted to store index and attribute portions related to each of the plurality of characters;
wherein the mapping memory means is adapted to operate responsive to the character memory means.

10. The display system of claim 8 wherein the mapping memory comprises:
a width associated with each of the plurality of characters; and
a height associated with each of the plurality of characters.

11. The display system of claim 8 wherein the mapping memory comprises a pointing means adapted to store an address associated with each of the plurality of bitmaps.

12. The display system of claim 11 wherein the pointing means is programmable.

13. The display system of claim 8 wherein the mapping memory comprises a number of top blank lines adapted to define a number of blank lines to include above each of the plurality of characters.

14. The display system of claim 8 wherein the mapping memory means comprises a static random access memory.

15. The display system of claim 8 wherein the mapping memory means comprises a plurality of flip-flop registers.

16. A method for displaying a character in an on-screen display application, comprising:
providing a character memory including a blank width portion adapted to store a blank width associated with the character;
providing a font memory adapted to store a bitmap of the character; and
providing a mapping memory adapted to build the bitmap responsive to the character memory.

17. The method for displaying of claim 16 wherein providing the character memory comprises:
storing an index associated with the character in the character memory; and storing at least one attribute associated with the character in the character memory.

18. The method for displaying of claim 16 wherein providing the character memory comprises:

storing a blank font width associated with the character in the character memory.

19. The method for displaying of claim 16 wherein providing the mapping memory comprises:

storing a height and width of the character in the mapping memory.

20. The method for displaying of claim 16 wherein providing the mapping memory comprises:

storing a pointer in the mapping memory, the pointer pointing to an address in the font memory.

21. The method for displaying of claim 20 wherein storing a pointer in the mapping memory comprises programming the pointer.

22. The method for displaying of claim 16 wherein providing the mapping memory comprises:

storing a top blank line number adapted to indicate a number of top blank lines associated with the character.

23. The method for displaying of claim 16 wherein providing the mapping memory comprises:

providing a static random access memory.

24. The method for displaying of claim 16 wherein providing the mapping memory comprises:

providing a plurality of flip-flop registers.

* * * * *

UNITED STATES PATENT AND TRADEMARK OFFICE
CERTIFICATE OF CORRECTION

PATENT NO. : 6,967,689 B1
APPLICATION NO. : 10/142547
DATED : November 22, 2005
INVENTOR(S) : Chu It is certified that error appears in the above-identified patent and that said Letters Patent is hereby corrected as shown below:

Column 4, line 15, please replace "pixilated image that is," with --pixelated image- that is,--
Column 6, line 28, please replace "Font[n]_Width Font [n]" with --Font[n]_Width=Font[n]--
Column 6, line 35, please replace "Font[n] Store" with --Font[n]_Store--
Column 7, line 5, please replace "Font[n]Width-1" with --Font[n]_Width-1--
Column 7, line 14, please replace "Font[n] Store" with --Font[n]_Store--
Column 7, line 14, please replace "Font[n]Width" with --Font[n]_Width--
Column 7, line 19, please replace "9_16" with --9~16--

Signed and Sealed this

Thirtieth Day of January, 2007

JON W. DUDAS
*Director of the United States Patent and Trademark Office*